March 24, 1970    A. L. PADDINGTON    3,502,298
PIPE COUPLING

Filed April 29, 1966    11 Sheets-Sheet 1

March 24, 1970    A. L. PADDINGTON    3,502,298
PIPE COUPLING
Filed April 29, 1966    11 Sheets-Sheet 5

March 24, 1970  A. L. PADDINGTON  3,502,298
PIPE COUPLING

Filed April 29, 1966  11 Sheets-Sheet 9

United States Patent Office 3,502,298
Patented Mar. 24, 1970

3,502,298
PIPE COUPLING
Arthur Loftus Paddington, Langley, England, assignor to Dracone Developments Limited, London, England, a British company
Continuation-in-part of application Ser. No. 385,168, July 27, 1964. This application Apr. 29, 1966, Ser. No. 546,429
Claims priority, application Great Britain, May 17, 1963, 19,742/63; May 3, 1965, 18,553/65
Int. Cl. F16l 29/00, 17/00; F16k 35/00
U.S. Cl. 251—149.9                                22 Claims

ABSTRACT OF THE DISCLOSURE

A pipe coupling of the bayonet type with slots on one part engaged by spigots on the other part which are cam-shaped and rotatable to tighten up the coupling after initial "push and twist" engagement. The spigot-cams may be diametrically opposite and mounted on a transverse shaft carrying a butterfly valve which is opened only when the coupling is tightened up. Both coupling parts may have both spigots and bayonet slots, the spigots on one part not being cam-shaped and acting only to resist sag of the coupling after tightening up by rotation of cam-shaped spigots on the other part. The slot assembly on one part of the coupling may be rotatable on the rest of that part to obviate twisting a pipe connected by the coupling.

---

This invention relates to pipe couplings, and this application is a continuation-in-part of my application No. 385,168 filed July 27, 1964, now abandoned.

The invention is especially useful where the coupling parts are relatively large, that is to say of such a size and weight that it is not easy for a man to manoeuvre the parts when he is coupling them together.

The invention provides a pipe coupling including a first coupling part, and a second coupling part, the second coupling part having two cam members each positionable behind a surface on the first coupling part by relative angular movement of the parts about their longitudinal axes to cause initial coupling of the parts, and the cam members being angularly movable about axes transverse to the longitudinal axes of the parts to cause the cam members to co-operate with their respective surfaces and effect a tighter coupling of the parts.

Embodiments of the invention will now be described, by way of example with reference to the accompanying drawings, in which:

FIGURE 5 is a composite view of the coupling of FIGURE 4, partly in axial cross-section above the horizontal centre-line and, below that line, in side elevation with certain parts omitted, FIGURE 5A indicates, in cross-section, a detail of FIGURE 5 but with the coupling parts only initially coupled, type engagement.

Figure 1:
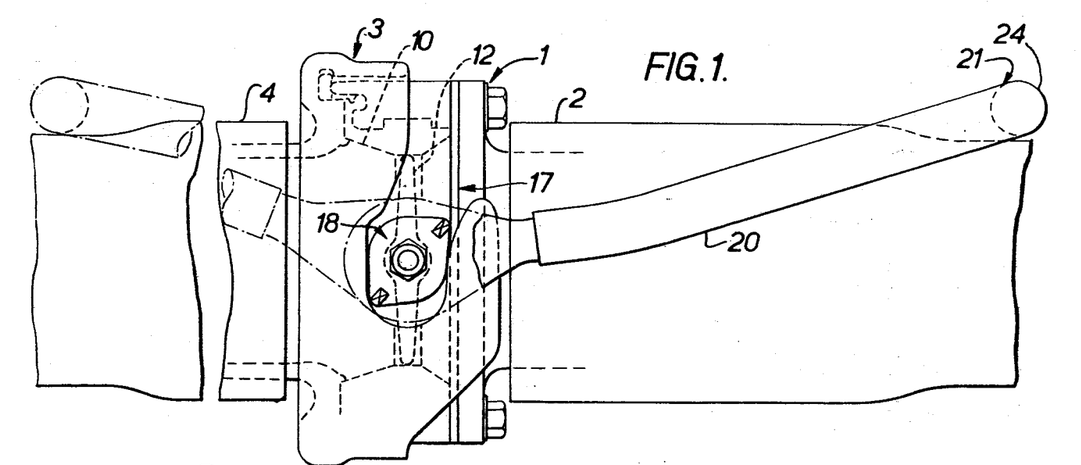
FIGURE 1 is a side elevation of a pipe coupling according to one embodiment, with the parts initially coupled.
Figure 2:
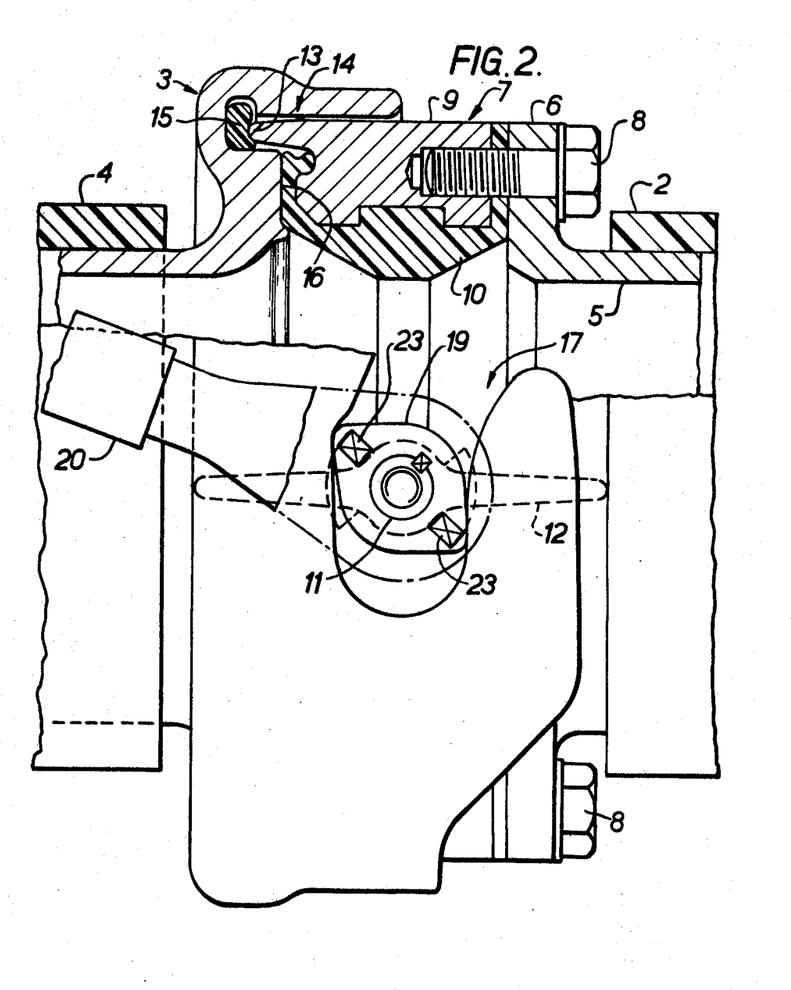
FIGURE 2 is a view, partly in side elevation and partly in axial cross-section, of the coupling in its fully tightened condition.
Figure 7:
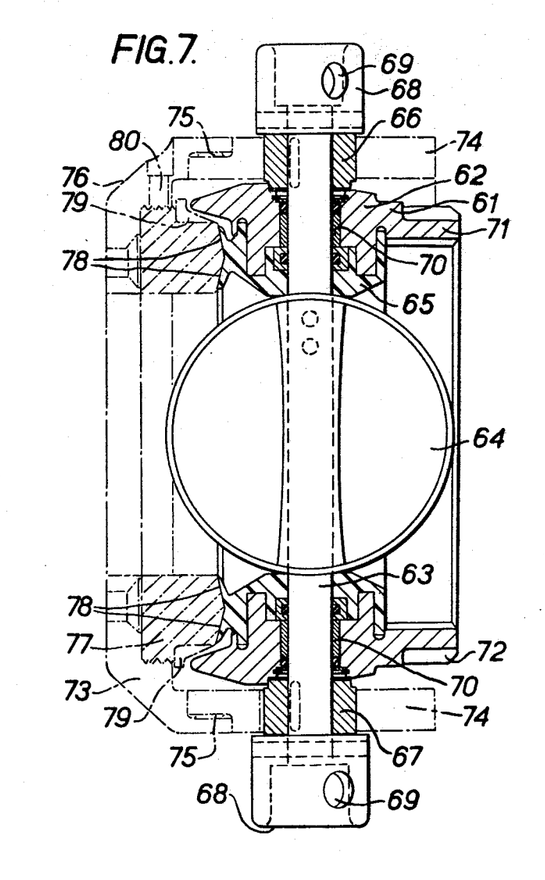
FIGURE 7 is an axial cross-sectional view, taken through the horizontal centre line of FIGURE 6, the female member being again shown in broken outline.

Referring to the accompanying drawings, the pipe coupling shown in FIGURES 1 and 2 comprises a male member 1, of generally ring shape, shown fitted to one end of a flexible pipe 2, and a female member 3, also of generally ring shape, shown fitted to one end of a flexible pipe 4. The male member 1 includes a tubular element 5, which includes at its left-hand end an annular flange 6. The method of securing pipe 2 to element 5 in a fluid-tight manner is of a conventional nature and is therefore not illustrated. The female member 3 also incorporates a tubular part to which pipe 4 is attached, also in a conventional fluid-tight manner (not illustrated). A valve device 7, manufactured in accordance with known principles (apart from the question of bayonet spigots, later to be described), also forms part of the male member 1 and is attached to flange 6 by a number of bolts 8 (of which only two are shown). The valve device 7 comprises an outer metal ring 9, an annular resilient sealing member (conveniently of a suitable synthetic rubber material) in the form of a liner 10 extending over the inner wall and two side walls of the ring 9, a shaft 11 scanning the ring 9 diametrically and extending therethrough to a like extent at each end, and a circular butterfly valve member 12 secured to the shaft 11 so as to be rotatable therewith. Each end of the shaft, where it passes through the ring 9, is ensleeved by a self-lubricating bush and a resilient O-ring seal is provided at each end of each bush, to effect fluid-tight sealing of the shaft and also, in conjunction with the liner 10, to complete the fluid-tight sealing of the valve and shaft when the valve member 12 is in its fully closed position. The bushes and O-ring seals are not shown in FIGURES 1 and 2, but an analogous arrangement of such parts is indicated in FIGURE 7.

Figure 3:
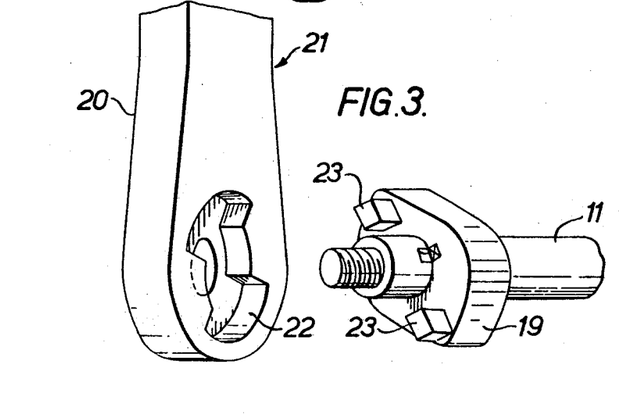
FIGURE 3 shows, in perspective views, one cam-shaped spigot and the co-operating end of an actuating handle.
Figure 3A:
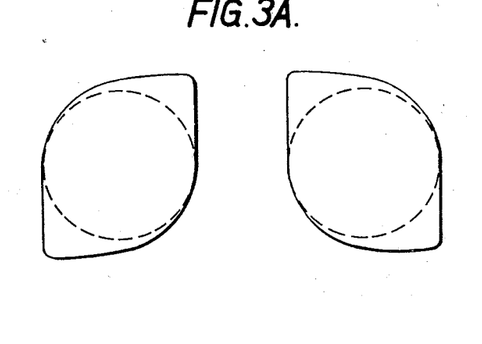
FIGURE 3A shows in end elevation the profiles of the two cam-shaped spigots employed in the coupling of FIGURES 1 and 2.

The ring 9 includes an annular rim 13 projecting beyond the liner 10, and the female coupling member 3 includes a co-operating annular recess 14, which is of increased width at its base, where a loosely fitting annular resilient sealing member 15 is located. Member 15 is also conveniently of a suitable synthetic rubber material. The female member 3 is provided with two diametrically opposed bayonet slots 17 and the male member 1 is provided with two cam-shaped bayonet spigots 18 comprising cams 19 keyed to the end portions of the shaft 11. Cams 19 are somewhat diamond-shaped in profile, each "corner" of the diamond being rounded off as shown. The bayonet slots 17 are both of identical shape and each includes a rebated portion, seen more clearly in FIGURE 2 in the region of the upper and left-hand "corner" of the cam 19. The two cams are symmetrically aligned with each other on the shaft. They are not identical, but are of complementary shapes, in the sense that if the cams be viewed side-by-side, in end elevation, with the shaft in the same angular position in each case, one cam would appear as a mirror image of the other. This is indicated somewhat schematically in FIGURE 3A, which shows how the cam profiles depart from the circular shape which is indicated in broken lines and is centred on the axis of rotation. In FIGURE 3A, the left-hand cam corresponds to the cam shown in FIGURES 1 and 2, and the right-hand cam corresponds to the one which is not visible in those Figures.

The axis of rotation of each cam coincides with the axis of rotation of the shaft 11, and the cam-shaped spigots are rotatable in unison about their axes (in this case a common axis as just mentioned), by means of a common inter-connecting U-shaped handle 21, the extreme end portions of the shaft 11 being screw-threaded and passing through the ends of the side legs 20 of handles 21, enabling fastening nuts to be applied to the shaft. The nuts are preferably locked on to the shaft but are not fully tightened, so that a certain amount of lost-motion may be permitted (for a purpose to be explained later).

Before the two members are coupled together, the handle 21 will occupy the same position as shown by the full lines in FIGURE 1, relative to the male member, and the cams 19 will occupy the same rotary position as shown by the broken lines in FIGURE 1. In that position the butterfly valve member 21 will be in its fully closed position, also indicated in broken lines in FIGURE 1.

When coupling the two members together, an initial bayonet-type engagement is made by means of the slots 17 and the co-operating cam-shaped spigots, involving a relative rotation between the two members of approximately 22° from entry to completion. As a result of this initial engagement (i.e. the position of FIGURE 1), the annular rim 13 engages the sealing member 15 to provide an initial fluid-tight seal. The spigots are then rotated about their axes by means of handle 21 (which is moved over to the left-hand broken-line position of FIGURE 1) and are thereby caused to bear against the righthand side walls of the slots (as shown more clearly in FIGURE 2) to effect a further tightening of the coupling, and in the course of that further tightening a further fluid-tight seal is effected between the left-hand annular surface of liner 10 and a co-operating annular surface 16 on the female member 3. The said further tightening of the coupling is substantially uniform because of the symmetrical disposition of the spigots and of the co-operating slots and the general symmetry of the annular parts involved. During that further tightening of the sealing member 15 merely expands further into the free space at the base of the annular recess 14. After the said initial engagement and before the further tightening of the coupling, there would probably be a slight annular gap (not shown) between liner 10 and surface 16. Subsequent to the aforesaid initial engagement, the further tightening of the coupling does not require any further relative rotation between the two members of the coupling.

Rotation of the spigots by means of the handle 21 also effects the opening of the butterfly valve member 12, which, together with the spigots, is rotated through an angle of 90° to a fully open position, as indicated in broken lines in FIGURE 2. If it were felt desirable to provide a positive means of maintaining the valve fully open, the handle 21 could be strapped to the pipe 4.

Before the valve is opened, and once the aforesaid initial engagement has been made, there is (i) a fluid-tight seal around the valve member 12 (due to its engagement with the liner 10 and to the O-ring seals around the shaft, as mentioned earlier), (ii) a fluid-tight seal between flange 6 and ring 9 (due to the clamping between them, by bolts 8, of the right-hand flange portion of liner 10), (iii) a fluid-tight seal between male and female members (due to engagement of the sealing member 15 by rim 13), and, of course, (iv) conventional fluid-tight sealing between the respective coupling members and the pipes 2 and 4.

When the spigots are rotated through 90° by actuation of handle 21, there is the further fluid-tight seal established between liner 10 and surface 16, due to the cams having been caused to bear against the right-hand side wall of their respective slots to effect the aforesaid further tightening of the coupling, and the cam 19 of FIGURE 2 will then be so positioned in its slot that it will prevent disengagement of the coupling whilst so positioned. This is due to the shaping of the rebated portion of the slot and the position of the upper and left-hand "corner" of the cam 19 relative to that rebated portion. (Since both slots 17 are identical in shape, it does not matter which cam-shaped spigot enters which slot for the initial engagement—one of the cams will, after the further tightening of the coupling, be positioned to prevent disengagement as mentioned above.) Thus, while the valve is fully open, the coupling cannot be disengaged. Without some form of locking means, then torsion in one or other of the coupled pipes might cause the coupling to become disengaged. Even if torsion were absent, it would be desirable to be able to prevent accidental disengagement of the coupling, although it is conceivable that in some cases there might be sufficient friction between liner 10 and surface 16 to prevent accidental disengagement in the absence of any positive locking means.

To disengage the coupling the handle 21 is first moved back to the right-hand full-line position shown in FIGURE 1. This action, by reversing the 90° rotation of the bayonet spigots, slackens off the coupling and closes the valve member 12, whilst a fluid-tight seal is still maintained by means of rim 13 and sealing member 15. Thereafter, with the valve closed, the two members of the coupling may be disengaged by relative rotation of the members to remove the spigots from the bayonet slots. With the coupling disengaged, the female member may be closed, if desired, by means of an expanding plug (not shown) or even by a special closure plate (not shown) provided with rotatable cam-shaped spigots adapted to co-operate with the bayonet slots, either individually or in unison by means of a common handle, in a manner somewhat analogous to the operation of the male coupling member already described. The valve member 12 (after disengagement of the coupling) is conveniently retained closed by strapping the handle 21 to the pipe 2.

It will by now have become apparent that although the cam-shaped spigots and the valve member 12 are rotatable through only 90° between the extreme conditions of "valve fully closed" and "valve fully open," the handle 21 is pivotable through a greater angle (in this case about 150°) between those two alternative conditions. This is enabled by a lost-motion device, which will now be described with reference to FIGURE 3. The inner face of each end portion of the handle 21 is formed with diametrically opposite arcuate recesses 22 which merge with the opening for the shaft and which co-operate with lugs 23 on the outermost end face of the respective cam. The recesses 22 extend over an arc of about 60°, so that the handle will have that amount of lost motion (from either position indicated in FIGURE 1) before engaging the lugs 23 to rotate the cam-shaped spigots (and hence the valve 12) from one extreme position to the other. It is thus arranged that at each end of the range of movement of the handle 21, its U-bend 24 lies against the respective pipe 2 or 4, and, as mentioned earlier, the handle may be strapped to the respective pipe if desired.

It is difficult to give a precise definition to the term "fluid-tight" when used in connection with the resilient sealing members described. In one practical example, in the case of a coupling intended to be used to connect together two pipes through which fuel oil is to be pumped from one container to another under a pressure of the order of 200 to 250 pounds per square inch (about 14 to 17.5 kilogrammes per square centimetre), convenient standards for determining whether the seals are sufficiently fluid-tight would be (i) that the coupling, after initial engagement but before further tightening, should be able to withstand a test pressure of 150 pounds per square inch (about 10.5 kilogrammes per square centimetre) for three minutes without leaks, (ii) that the coupling, after the further tightening, with the valve fully open, should be able to withstand a test pressure of 400 pounds per square inch (about 28 kilogrammes per square centimetre) for five minutes without leaks, and (iii) that the sealing of the valve, when fully closed, should be able to withstand a test pressure of 150 pounds per square inch (about 10.5 kilogrammes per square centimetre) for five minutes without leaks.

Figure 4:
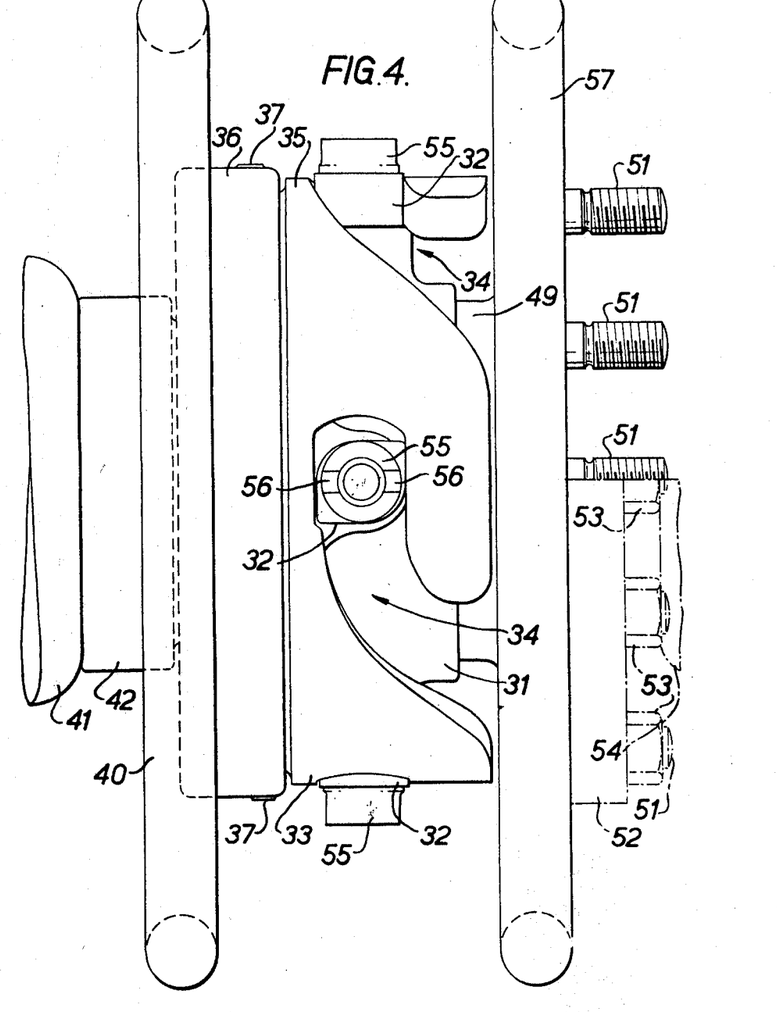
FIGURE 4 shows another form of pipe coupling, in side elevation and in its fully tightened condition.
Figures 5, 5A:
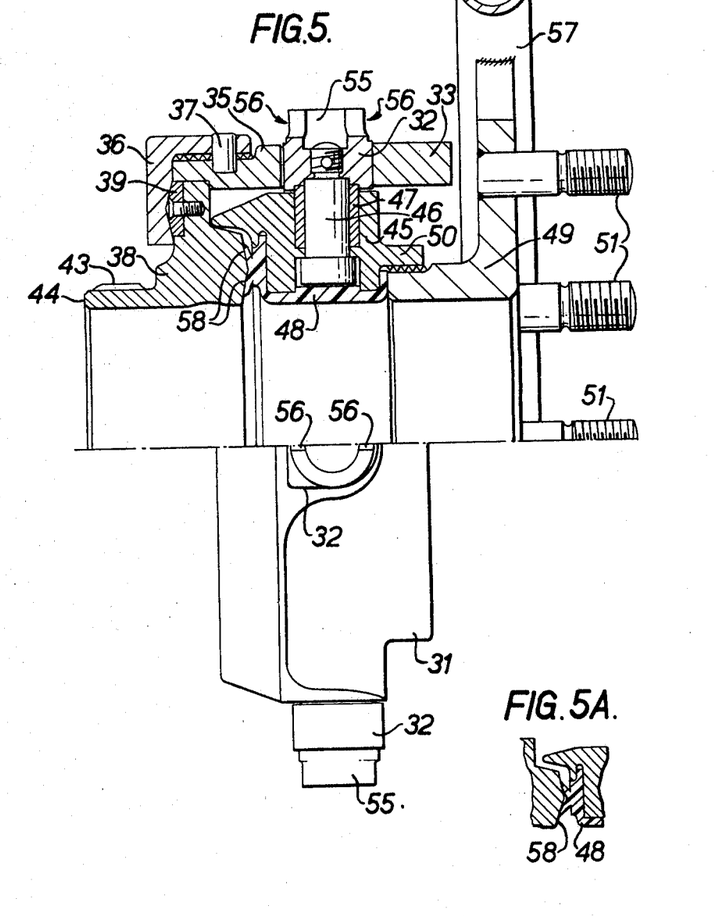

FIGURES 4, 5 and 5A are illustrative of another embodiment of the invention, somewhat analogous in principle to the embodiment of FIGURES 1 and 2, the main difference being (i) that individually rotatable cam-shaped spigots are employed, (ii) that no valve device is employed in the coupling, and (iii) that the part of the female member in which the bayonet slots are formed is capable of a swivelling movement relative to the rest of the female member.

In FIGURES 4 and 5 the coupling is shown in the position in which the further tightening of the coupling has been effected. In the right-hand portion of FIGURE 4, the male coupling member ends with an adaptor above the horizontal centre line, and below that line, in broken outline, is shown part of a conventional flanged type of pipe end-piece secured to the adaptor by lock-nuts. In FIGURE 5, both male and female coupling members are shown in sectional elevation above the horizontal centre line, and below that line is shown only the male member, in side elevation, but without the screw-threaded adaptor.

In this coupling, a male member 31, having four cam-shaped rotatable bayonet spigots 32 symmetrically disposed around its periphery, is adapted to co-operate with a female member 33 having four symmetrically disposed and identical bayonet slots 34 around its periphery. The peripheral tubular portion 35, in which the bayonet slots are formed, is screwed into an annular portion 36 of approximately L-shape in cross-section, and the two portions (which are locked together by pegs 37) together form an element capable of a swivelling movement relative to the remaining portion 38 of the female member, an annular self-lubricating bearing element 39 being provided, which is secured to portion 38 by screws (of which only one is shown in FIGURE 5). A handling wheel 40 (omitted from FIGURE 5) is provided, which is conveniently welded to the portion 36, to facilitate manipulation of the swivelling element of the female member. Fastening of the female member to a pipe 41 is achieved by means of a standard type of tubular pipe end-piece 42, the internal screw-thread of which meshes with the external screw-thread 43 of portion 38, a sealing gasket (not shown) being interposed between the annular end face 44 and a co-operating annular surface (not shown) in the end-piece 42. The end-piece 42 and portion 38 are preferably locked in their assembled position by transverse pins or screws (not shown).

The male member 31 comprises (i) a metal ring 45, having four radial holes which locate the rotary spindles 46 of the bayonet spigots 32, of which the cam-shaped portions are screwed and pinned to the outer ends of the spindles 46, each spindle being provided with a self-lubricating bush 47, (ii) an annular resilient sealing member 48 which is very approximately of U-shape in cross-section, and (iii) a flanged tubular adaptor element 49 which makes screw-threaded engagement with the tubular portion 50 of rings 45, compressing the right-hand annular flange of sealing member 48 between the ring 45 and the left-hand end face of the adaptor element 49, the portion 50 and element 49 being preferably locked in their assembled position by transverse pins or screws (not shown).

The annular flange of the adaptor element 49 is provided with a plurality of studs 51 to enable a conventional flanged type of pipe end-piece 52 to be secured to the adaptor element (with an interposed sealing gasket, not shown) by lock-nuts 53. The end-piece 52 is attached to a pipe 54 intended to be connected with pipe 41 by the coupling illustrated. The adaptor element 49 is also provided with a handling wheel 57, so that the initial engagement of the coupling may be made by gripping wheel 57 and rotating wheel 40, if necessary, until the bayonet spigots can enter the slots, and manipulating wheel 40 until the spigots have entered the slots to a sufficient extent. During such manipulation the slotted element of the female coupling member can swivel relative to portion 38, so that neither of the pipes which are to be coupled together needs to be caused to rotate at all.

The cam portions of the spigots 32 each include an integral cylindrical and outwardly extending portion 55 having diametrically opposite U-shaped slots 56 formed therein, to permit rotation of the spigots by means of a separate tool (not shown), somewhat resembling a ring-spanner and incorporating a tubular sleeve with a transverse rod, the sleeve being dimensioned to fit over the portions 55 and the transverse rod being dimensioned to fit within the U-shaped slots 56.

In FIGURES 4 and 5 the cam-shaped spigots are shown in the positions they occupy when the earlier-mentioned further tightening of the coupling has been effected. All four cam-shaped portions are identical in profile, and if each cam were viewed in plan view in its position prior to effecting the said further tightening, its profile would be somewhat similar to the right-hand cam profile of FIGURE 3A. After the initial engagement between the male and female members of the coupling, the spigots are rotated in a clockwise manner through an angle of 90° to the angular position indicated by the central spigot of FIGURE 4, so as to effect the said further tightening of the coupling, each cam being then in such a position that its lower and left-hand "corner" is in the region of the rebated portion of the respective bayonet slot, thereby preventing accidental disengagement of the coupling whilst the cams are so positioned.

In the fully tightened position of the two coupling members, a fluid-tight seal is maintained between the annular surface 58 of portion 38 and the left-hand annular surface of the sealing member 48. The spigot-locating holes in ring 45 are also effectively sealed off by the cylindrical portion of member 48. Thus, by means of the sealing member 48 and the sealing gaskets already mentioned, the coupling provides a fluid-tight connection between the two pipes joined by the coupling. During or as a result of the initial engagement of the coupling (and before the further tightening is effected) an initial fluid-tight seal is made by the surface 58 and the left hand annular surface of the sealing member 48, although a slight annular air space will probably remain between those surfaces (as indicated by FIGURE 5A), the air space disappearing when the coupling members are fully tightened together. Thus an initial fluid-tight seal is effected by an initial compression (or distortion) of the left-hand annular portion of member 48 and this is followed by further compression of that annular portion when the further tightening of the coupling is effected.

Standards relating to "fluid-tightness" in the case of a coupling such as described with reference to FIGURES 4 and 5A may be of a similar order to those mentioned by way of example in connection with the coupling of FIGURES 1 and 2 (but ignoring the references to a valve device).

Figure 6:
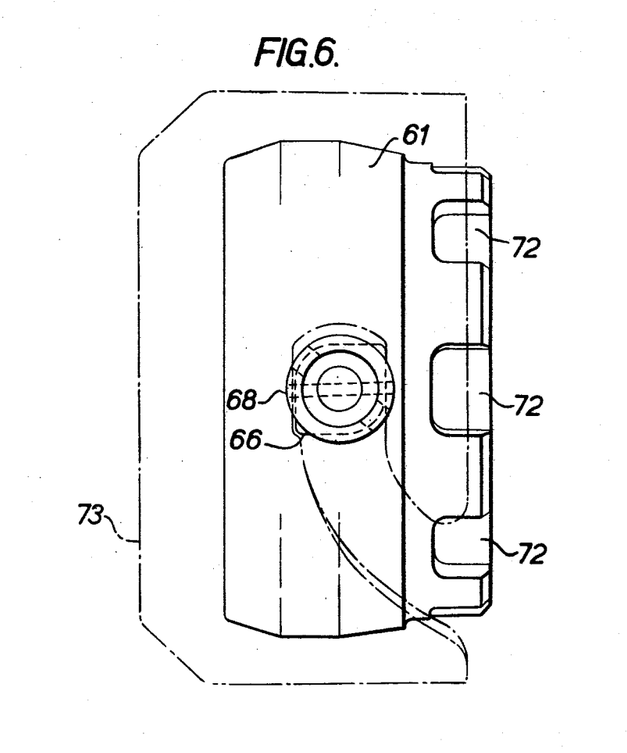
FIGURE 6 is a side elevation of a third form of pipe coupling, with certain parts omitted and with the female coupling member shown in broken outline, the coupling being in its fully tightened condition.

A third embodiment of the invention will now be described with reference to FIGURES 6 and 7. FIGURE 6 shows a pipe coupling in side elevation, with the female member in broken outline, but omitting the elements (which may be conventional pipe end-pieces) by means of which the coupling members may be actually connected to the ends of pipes. FIGURE 7 is a sectional elevation of the coupling, also omitting the elements omitted from FIGURE 6.

This embodiment somewhat resembles in principle the embodiment of FIGURES 1 and 2, the main differences being the provision for rotation of the spigots by means of a tommy bar or like implement and the use of a single annular resilient sealing member to effect both an initial fluid-tight seal during or as a result of the initial engagement of the two members of the coupling and an improvement of that seal when the two coupling members are further tightened together by the rotation of the bayonet spigots.

The male member 61 comprises (i) a metal ring 62 having two diametrically opposite holes, through which pass a shaft 63, to which is secured a butterfly valve member 64, shown in its fully opened position (i.e. with the coupling members fully tightened together), (ii) an annular resilient sealing member 65, and (iii) two diametrically opposite cam-shaped rotatable bayonet spigots constituted by cams 66, 67 and the end parts of the shaft 63 to which the cams are keyed. (The cams are symmetrically aligned on the shaft 63 and are of complementary shapes in profile, the cam 66 having a profile somewhat similar to the right-hand cam profile of FIGURE 3A.)

A short portion of each extremity of the shaft 63 carries a hollow cylindrical member 68, pinned to the shaft. Each member 68 has two diametrically opposite holes 69 formed therein to permit actuation of the valve device and the spigots by means of a tommy bar or like implement inserted through the holes 69 of one of the members 68. Each end portion of the shaft 63, where it passes through the respective hole in ring 62, is encircled by a self-lubricating bush 70, located between two O-ring seals, and each outermost O-ring seal is kept in place by a retaining washer and a circlip type of fastener let into an annular groove in the wall of the respective hole in ring 62.

The right-hand tubular portion 71 of the ring 62 is internally screw-threaded to mate with an external screw-thread on a tubular element (not shown) and to which an end of a flexible pipe is attached (or intended to be attached). Such a tubular element would be screwed into the portion 71 until its left-hand end face sufficiently compressed the right-hand annular wall of sealing member 65 to form a fluid-tight seal, and the inter-engaged tubular element and portion 71 would then preferably be locked in that position by transverse pins or screws (not shown). Alternatively, the portion 71 could be engaged with an adaptor element (not shown) such as the element 49 in the embodiment of FIGURES 4 and 5, and for a similar purpose. The portion 71 is provided externally with a series of recesses 72 enabling the application of a C-type spanner to facilitate the securing together of portion 71 with either the tubular element or adaptor element, as the case may be.

The female member 73 is provided with two identical and diametrically opposite bayonet slots, each adapted to receive one or the other of cams 66, 67, each slot having a rebated portion as in the two previously described embodiments and for a similar purpose, although only one of the cams would be effective to prevent disengagement of the coupling (as in the case of the embodiment of FIGURES 1 and 2).

The female member 73 is conveniently formed in three parts (74, 76, 77), of which the tubular part 74 (in which the bayonet slots are formed) makes annular screw-threaded engagement 75 with annular part 76, into which is screwed the further annular part 77, which is conveniently made of Tufnol (trademark) synthetic material. Part 77 provides an annular surface 78 (readily renewable by replacement of part 77 with a fresh similar part) for making a fluid-tight seal by engagement with the left-hand annular surface of sealing member 65. Before the part 77 is screwed into place, the female member is secured to a conventional flanged type of pipe end-piece (with a sealing gasket interposed) by means of several countersunk screws and lock-nuts. The part 77 is provided with a number of ribs 79 to facilitate gripping of the part 77 during insertion or removal thereof relative to part 76. When part 77 is fully screwed into place, it is locked in position by a transverse screw inserted into opening 80.

When bringing the two coupling members together when in actual use, the butterfly valve member 64 will initially be fully closed (i.e. in a rotary position at 90° to the position indicated in FIGURE 7) and the valve will be sealed in a fluid-tight manner much in the same way as the valve in the embodiment of FIGURES 1 and 2. The initial bayonet-type engagement between male and female members will result in an initial fluid-tight seal being effected between annular surface 78 and sealing member 65, much in the manner previously described in connection with FIGURE 5A. The further tightening of the coupling by rotation of the two cam-shaped spigots in unison through 90° (by means of a tommy bar, etc., inserted through the holes 69 of one or other of the members 68) will (i) cause an improvement in the said initial fluid-tight seal by reason of a further compression or distortion of the sealing member 65 by surface 78 to the relative position indicated in FIGURE 7, (ii) open the valve fully to the position shown in FIGURE 7, and (iii) cause a "corner" of one of the two cams to enter the region of the rebated portion of the respective bayonet slot so as to prevent disengagement of the coupling whilst the spigots remain thus positioned.

Standards relating to "fluid-tightness" in the case of a coupling such as described with reference to FIGURES 6 and 7 may be of a similar order to those mentioned by way of example in connection with the coupling of FIGURES 1 and 2.

There may be occasions when it is desired to connect together two pipes, each provided with a male coupling member designed to enable it to form part of a pipe coupling according to the invention, and to provide for such an occasion a further feature of this invention is a double-ended female coupling member, having at each end a plurality of suitably shaped bayonet slots and also incorporating, if desired, an annular resilient sealing member or members and/or annular surfaces designed to co-operate respectively with annular surfaces and/or annular resilient sealing members, as the case may be, incorporated in the male coupling members that are to be connected together by the double-ended female coupling member. Although no such double-ended female coupling member is illustrated in the accompanying drawings, a suitable construction of such a member could be readily designed by a person skilled in the art and now in possession of the information contained in this specification. For example, such a member could simply consist of two coupling members such as 73 of FIGURES 6 and 7, the two members being secured to each other, back-to-back, with a suitable sealing gasket between them if necessary.

Figure 8:
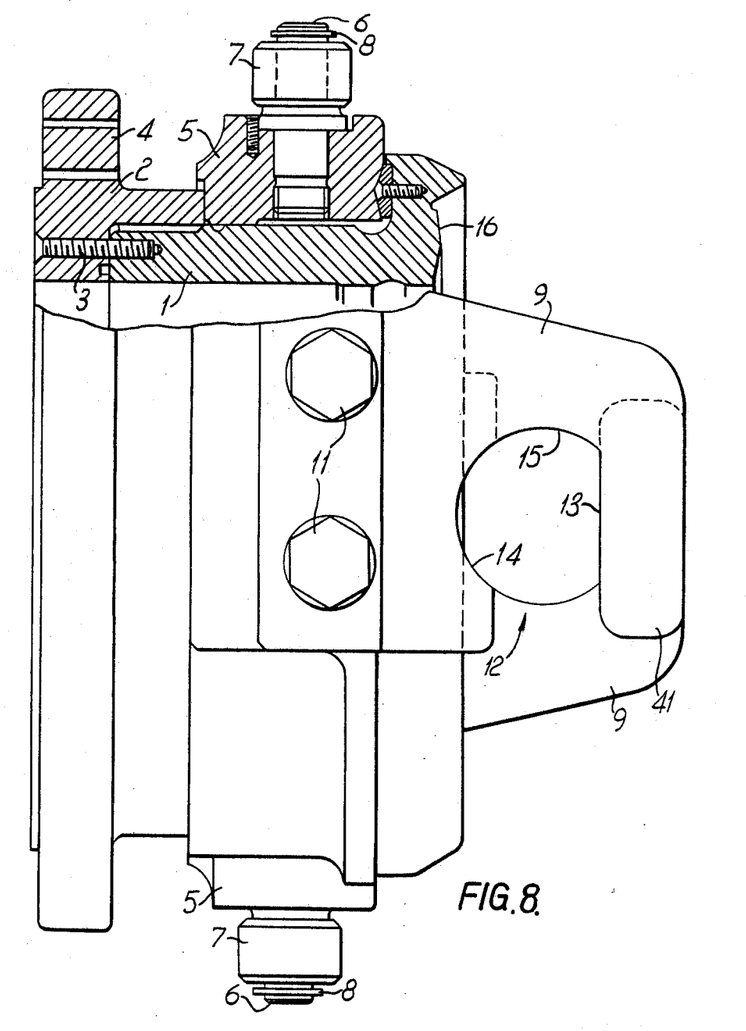
FIGURE 8 is a side view, partly in section, of the first part of another pipe coupling.

Referring now to FIGURE 8, the first coupling part includes a hollow body 101 and a flanged member 102 secured to the rear end of the body 101 by bolts 103. The flanged member 102 has a series of apertures 104 in its flange to enable a first pipe to be secured to the first coupling part.

The outer surface of the body 101 has two diametrically-opposite recesses, each of which locates a support block 105 which is held in the recess by the flanged member 102. Each block 105 carries an outwardly-projecting shaft 106 on which a roller 107 is rotatably mounted, each roller 107 being retained on its shaft 106 by a circlip 108.

The body 101 also carries two diametrically-opposite slot members 109, which are located at positions displaced 90° around the body 101 from the rollers 107. Each slot member 109 is bolted to the body 101 by bolts 111, and projects forwardly from the body 101. Each slot member 109 has an open-end slot 112 which extends from its open end to its closed end in a direction generally circumferential to the body 101. The forward side surface 113 of each slot 112 is straight, apart from a curved lead-in, and is perpendicular to a plane including the longitudinal axis of the body 101. The rear side surface 114 of each slot 112 is initially straight and parallel to the forward side surface 113 and then curves rearwardly to form a smooth curved surface with the rear end surface 115 of the slot. Viewed from the front of the first coupling part, that is to say from the right in FIGURE 8, each slot 112 extends from its closed end to its open end in an anti-clockwise sense. The forward end 116 of the body 101 lies between the slots 112 and the rollers 107 in the axial sense and is shaped for engagement with an annular seal 117 carried by the second coupling part, which is shown in FIGURE 9.

The second coupling part includes a hollow body 118 to whose rear end is secured a pipe 119. The body 118 carries two diametrically-opposite outwardly-projecting shafts 121 on each of which a cam member 122 is rotatably mounted, each cam member 122 being retained on its shaft 121 by a circlip 123. The cam members 122 are rotatable about the shafts 121 by a U-shaped handle 124 whose free end portions fit into open ends of the cam members 122. Each free end portion of the handle 124 is retained in the open end of the respective cam member 122 by a pin 125. Each cam member 122 has a cam surface 126A, 126B respectively surrounding the shaft 121. The cam surfaces 126A, 126B are shown in FIGURES 10A and 10B, and FIGURES 11A and 11B respectively.

Figure 9:
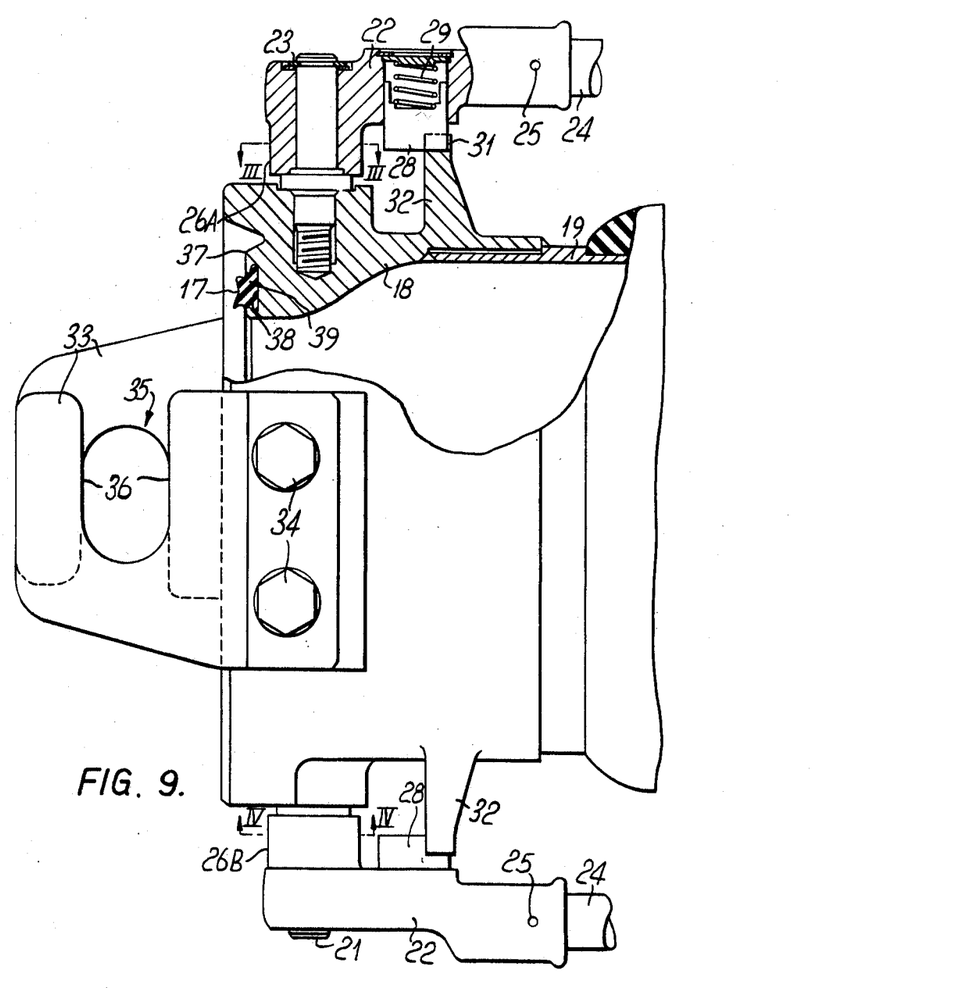
FIGURE 9 is a side view, partly in section, of the second part of the pipe coupling, but displaced 90° around the longitudinal axis of the part from the position in which it co-operates with the first coupling part.

Each cam member 122 carries a movable stop member 128 which is urged by a spring 129 to a position in which, when the handle 124 is in the position shown in FIGURE 9, it projects into a slot 131 in a projecting part 132 of the body 118. When the stop members 128 are so engaged in the slots 131, the handle 124 and hence the cam members 122 cannot be moved relative to the body 118. As will be described later, the stop members 128 are disengaged from the slots 131 by the slot members 109 of the first coupling part when it is being coupled to the second coupling part.

The body 118 also carries two diametrically-opposite slot members 133, which are located at positions displaced 90° around the body 118 from the cam members 122. Each slot member 133 is bolted to the body 118 by bolts 134, and projects forwardly from the body 118. Each slot member 133 has an open-ended slot 135 with parallel side surfaces 136. Viewed from the front of the second coupling part, that is to say from the left in FIGURE 9 each slot 135 extends from its closed end to its open end in an anti-clockwise sense. The forward end 137 of the body 118 lies between the slots 135 and the cam members 122 in the axial sense.

The radially-inner portion of the forward end 137 of the body 118 has an annular recess 138 in which a portion of the previously-mentioned annular seal 117 is located, the remaining portion of the annular seal 117 projecting from the annular recess 138. The radial length of the inner part of the recess 138 is slightly less than the radial length of that portion 139 of the seal which fits therein, such that when the second coupling part is not coupled to the first coupling part, the annular seal 117 is arched slightly away from the base of the recess 138, that is to say arched leftwards in FIGURE 9, although such arching has not been shown. It has been found that such an arrangement provides a better seal between the annular seal 117 and the body 118 when the annular seal 117 is under pressure from the first coupling part, which pressure will generally be sufficient to force the annular seal 117 against the base of the recess 138.

FIGURES 10A and 10B and FIGURES 11A and 11B illustrate the cooperating action of the cam surfaces 126A and 126B respectively of the cam members 122 and the slot members 109.

Figure 10A:
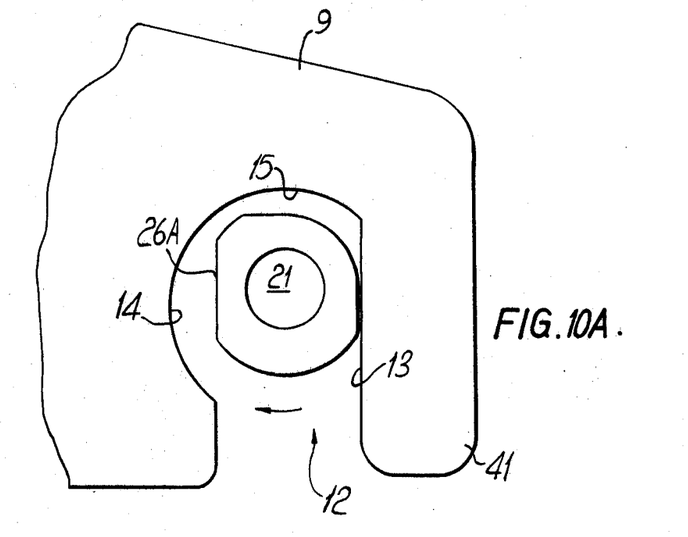
FIGURES 10A and 10B are diagrammatic views of one of the cam members of the second coupling part of FIGURE 9 in a slot in the first coupling part of FIGURE 8, FIGURE 10A showing the cam member in the initial coupling position and FIGURE 10B showing the cam member in the tight coupling position.
Figure 11A:
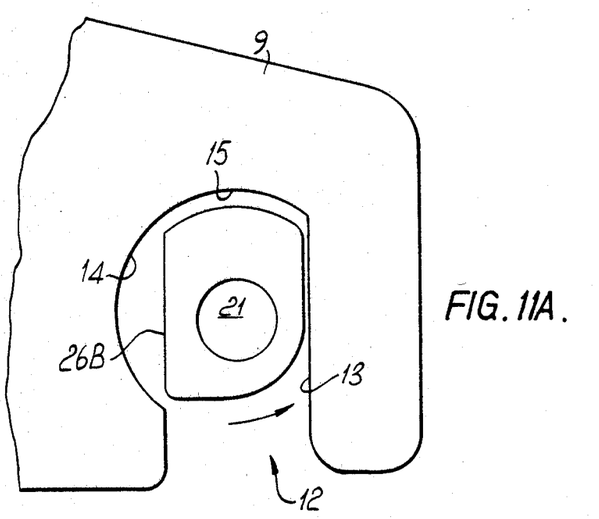
FIGURES 11A and 11B are diagrammatic views similar to FIGURES 10A and 10B of the other cam member of the second coupling part in a slot in the first coupling part.

To couple the first coupling part with the second coupling part, the two parts are moved towards one another until each roller 107 is adjacent the open end of a slot 135 and each cam surface 126A, 126B is adjacent the open end of a slot 112. The parts are then relatively twisted through a small angle about their longitudinal axes to cause the rollers 107 and cam surfaces 126A, 126B to enter the respective slots. As the parts are relatively twisted, the rollers 107 engage and roll along the forward surface 136 of the respective slots 135. At this stage, the annular seal 117 is engaging the forward end 116 of the body 101 to form a satisfactory seal against relatively low fluid pressures and the cam surfaces 126A and 126B are spaced by a small amount from the side surfaces 113 of the slots 112, as shown in FIGURES 10A and 11A. Also, the leading end portion 141 of each slot member 109 engages the associated movable stop 128 and moves it out of the slot 131.

Figure 10B:
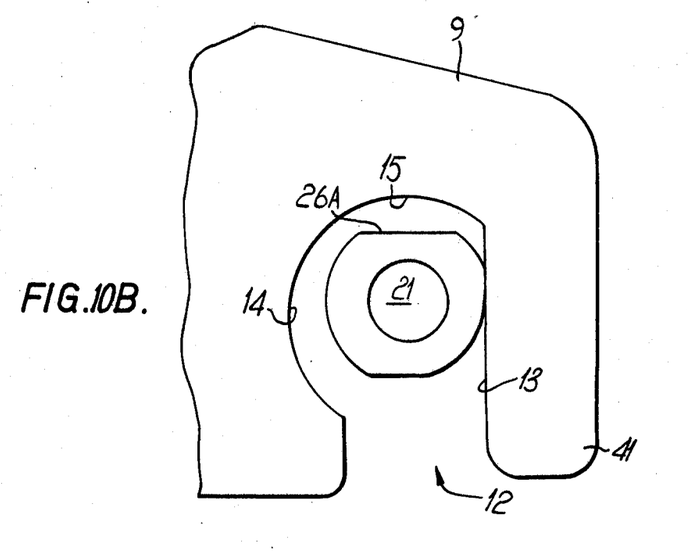
Figure 11B:
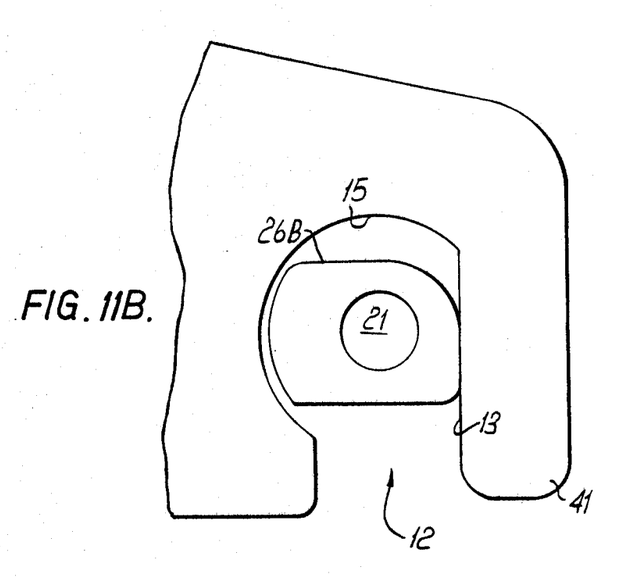

The handle 124 can then be moved angularly to rotate the cam surfaces 126A and 126B through 90° from the positions shown in FIGURES 10A and 11A to the positions shown in FIGURES 10B and 11B. The two coupling parts are thereby drawn closer together by cooperation of the cam surfaces 126A, 126B with the surfaces 113, and the annular seal 117 is compressed so as to provide a satisfactory seal against higher fluid pressures. At the same time, the rollers 107 become slightly spaced from the surfaces 136 of the slots 112. Also, the cam surface 126B has a portion adjacent the surface 114 of the slot 112 which cooperates therewith to prevent twisting of the pipes from disconnecting the coupling.

The rollers 107 and slot members 133 restrict relative tilting movement of the parts about an axis passing through the shafts 121 to an amount consistent with effective sealing action by the annular seal 117 which might otherwise be reduced if an undue amount of tilting movement occurred. The rollers 107 have no cam action.

The locking of the handle 124 in the uncoupled position by the stops 128 and slots 131 enables the second coupling part to be lifted by a man gripping the handle 124, when coupling the parts together, and also ensures that the cam surfaces 126A, 126B are in the correct position for entry into the appropriate slots 112.

Uncoupling of the parts is achieved by reverse movement of the handle 124. It may be arranged that there is lost motion between the handle 124 and the cam surfaces 126A, 126B so that, even though the cam surfaces 126A, 126B only rotate through 90°, the handle 124 moves through a greater angle during the coupling process, so that the handle 124 moves from a position close to one pipe to a position close to the other pipe.

Figure 12:
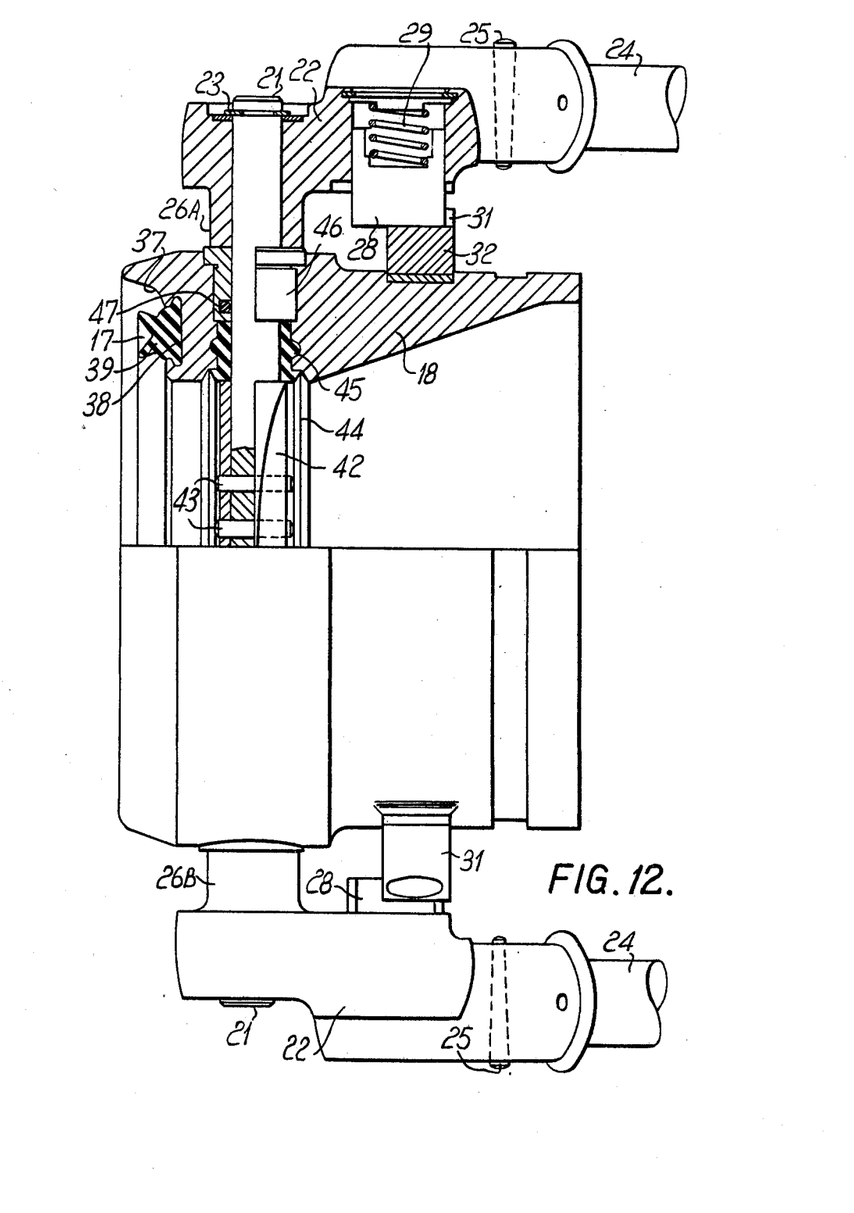
FIGURE 12 is a side view, partly in section, of the second part of another pipe coupling including a butterfly valve.

FIGURE 12 shows a second coupling part with a butterfly valve. It is in many respects similar to the part shown in FIGURE 9, and like reference numerals are used to indicate like items. Instead of two shafts 121, a single shaft 121 extends through the body 118, and carries a valve member 142 secured to the shaft 121 by pins 143. An annular seal 144 extends around the interior wall of the hollow body 118, and is engaged by the valve member 142 when it is in the closed position, as shown in FIGURE 12, to prevent flow of fluid through the body 118.

The shaft 121 passes through the annular seal 144 at diametrically-opposite positions, and at each of these positions the annular seal 144 has a projecting portion 145 surrounding the shaft 121. A bush 146 surrounds the shaft 121 and compresses the projecting seal portions 145 such that those projecting seal portions form an effective seal between the shaft 121 and the body 118. The bush 146 may carry a sealing ring 147 engaging the shaft 121 and a further sealing ring (not shown) engaging the body 118 in case fluid escapes past projecting seal portion 145 when the butterfly valve is open and uneven fluid pressures act on the projecting seal portions 145. Each portion 145 has an annular rib 148 located in a corresponding recess in the body 118 to retain the portion 145 in position.

The valve member 142 is moved to the open position by the movement of the handle 124 which rotates the shaft 121 and cam surfaces 126A, 126B in the tightening operation.

Figure 13:
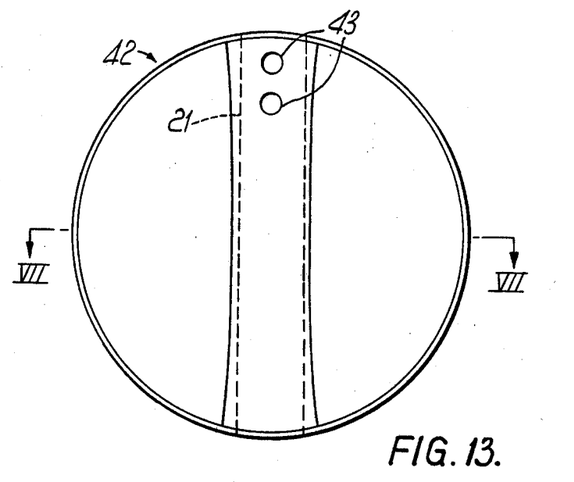
FIGURE 13 is a front view of a butterfly valve member suitable for use in the second coupling part shown in FIGURE 12.
Figure 14:
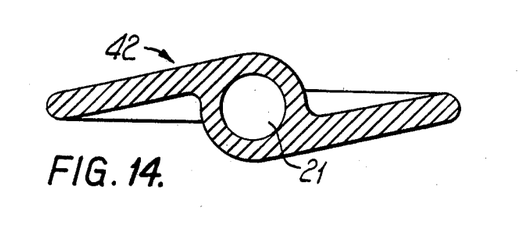
FIGURE 14 is a cross-sectional view of the butterfly valve member along the line 14—14 of FIGURE 13.

FIGURES 13 and 14 show one example of a suitable valve member 142, which has a cross-section recessed in opposite senses on opposite sides of its axis and thereby arranged to caue the fluid pressure in the coupling to exert a force on the valve member 142 which assists its movement to the closed position. Alternatively, the cross-section could be arranged to cause the fluid pressure in the coupling to exert a force on the valve member 142 which assists its movement to the closed position. Such forces are possible because when the valve is opening or closing the fluid pressure is not constant over the valve member 142.

The butterflly valve sealing arrangement shown in FIGURE 12 could be used with any suitable butterfly valve, whether it forms part of a pipe coupling or not. Similarly, the valve member shown in FIGURES 13 and 14 could be used in other circumstances.

I claim:

1. A pipe coupling including a first coupling part and a second coupling part, the second coupling part having two cam members each positionable behind a surface on the first coupling part by relative angular movement of the parts about their longitudinal axes to cause initial coupling of the parts, and the cam members being angularly movable about axes transverse to the longitudinal axes of the parts to cause the cam members to co-operate with their respective surfaces and effect a tighter coupling of the parts.

2. A pipe coupling according to claim 1 incorporating a valve device adapted to be maintained in a closed condition during the said initial coupling and to be opened by actuation of the cam members during the said tightening of the coupling.

3. A pipe coupling according to claim 2 in which the valve device is of the butterfly valve type.

4. A pipe coupling according to claim 3, in which the butterfly valve member is mounted on a shaft of which at least one end engages with, or forms part of, the valve actuating cam members.

5. A pipe coupling according to claim 3 wherein the valve member is mounted on a shaft having projecting opposite end portions extending into a housing, each projecting end portion of the shaft being surrounded by an annular sealing member which is loaded in a direction parallel to the length of the shaft to force the sealing member laterally against the shaft and the housing.

6. A pipe coupling according to claim 5 wherein each annular sealing member has an annular rib located in a corresponding recess in the housing to retain the sealing member therein.

7. A pipe coupling according to claim 5 wherein each annular sealing member projects from an annular seal which the valve member engages in its closed position.

8. A pipe coupling according to claim 3 wherein the valve member is so shaped that fluid under pressure exerts a force on the valve member which assists movement of the valve member to the closed position.

9. A pipe coupling according to claim 1 in which the cam members and the co-operating surfaces are so shaped and arranged that when the said tightening of the coupling has been effected, at least one of the cam members will be so positioned as to prevent disengagement of the coupling whilst the cam member remains in that rotary position.

10. A pipe coupling according to claim 1 comprising two diametrically-opposite cam members which are rotatable in unison between the positions in which the said initial coupling is made and the positions which they occupy when the said tightening of the coupling had been effected.

11. A pipe coupling according to claim 10, in which the two cam members are rotatable by means of an interconnecting handle.

12. A pipe coupling according to claim 11 including lost-motion means enabling the handle to be rotated through a greater angle than the cam members.

13. A pipe coupling according to claim 1 wherein one coupling part includes an element on which the said surfaces are provided and which is capable of a swivelling movement relative to the remainder of the coupling part, such that the said initial coupling can be effected without necessitating any rotation of the said remainder of the coupling part or of the other coupling part.

14. A pipe coupling according to claim 1 including at least one additional member without cam action on one part which is positioned behind a surface on the other part by initial coupling of the parts and which co-operates with the surface to limit relative tilting of the parts about an axis transverse to the longitudinal axes of the parts when the parts are tightly coupled.

15. A pipe coupling according to claim 14 having two diametrically-opposite cam members and two diametrically-opposite additional members displaced by 90° from the cam members.

16. A pipe coupling according to claim 15 wherein, during initial coupling of the parts, the cam members are spaced from their respective surfaces and the addititonal members engage their respective surfaces, and tight coupling of the parts results in the cam members engaging their respective surfaces and the additional members becoming spaced from their respective surfaces.

17. A pipe coupling according to claim 14 wherein the or each additional member is carried by the first coupling part.

18. A pipe coupling according to claim 14 wherein the or each additional member includes a roller engageable with the respective surface.

19. A pipe coupling according to claim 1 wherein the second coupling part has locking means which locks the cam members in the desired angular position for initial coupling when the second coupling part is not coupled to the first coupling part.

20. A pipe coupling according to claim 19 wherein the first coupling part has unlocking means which actuates the locking means to release the cam members during initial coupling.

21. A pipe coupling according to claim 20 wherein the locking means includes a pair of spring-loaded stops, one for each cam member, each stop being engageable with a slot to lock the relevant cam member and being forced out of the slot by the unlocking means of the first coupling part during initial coupling to release the cam member.

22. A pipe coupling including a first coupling part and a second coupling part each of generally annular form centered upon a main axis and each having a face generally normal to that axis and adapted to make sealing engagement with the said face on the other part, the first coupling part comprising a plurality of projections each defining a surface facing towards the coupling part and following a course which is generally circumferential of the main axis from a first end fixed to the first coupling part to a second end which is accessible from the side of the projection remote from the said surface, the second coupling part comprising a like plurality of spigot members each rotatable about an axis radial of the main axis and comprising a cam-shaped portion movable between a first position in which the part of the cam profile nearest to the second coupling part is at a predetermined distance from the second coupling part and a second position at which the part of the cam profile nearest to the second coupling part is nearer thereto than the said predetermined position, the said cam-shaped portions of the said spigots being positioned so that, in their first positions, they may be entered around the said projections and into engagement with their said surfaces at the said accessible second ends thereof, whereafter relative rotation of the two coupling parts about their common axis moves the said cam-shaped portion of each spigot towards the first end of the corresponding projections surface to effect preliminary engagement of the two coupling parts and, further, whereafter rotation of the said spigots to their said second positions draws the said faces of the two coupling parts together into closer engagement.

References Cited

UNITED STATES PATENTS

| | | | |
|---|---|---|---|
| 1,700,073 | 1/1929 | Parker et al. | 241—149.9 |
| 2,625,410 | 1/1953 | Crowley | 251—148 XR |
| 2,790,571 | 4/1957 | Flaith et al. | 251—149.9 |
| 2,992,655 | 7/1961 | Davis | 251—148 XR |
| 3,104,896 | 9/1963 | Kennedy | 285—312 XR |

WALTER A. SCHEEL, Primary Examiner

R. I. SMITH, Assistant Examiner

U.S. Cl. X.R.

137—614.06; 251—106; 285—312, 361